United States Patent
Haack et al.

(10) Patent No.: US 11,560,242 B2
(45) Date of Patent: Jan. 24, 2023

(54) METHOD OF MANUFACTURING A STRUCTURAL PART FOR A VEHICLE, IN PARTICULAR AN AIRCRAFT OR SPACECRAFT

(71) Applicant: Premium Aerotec GmbH, Augsburg (DE)

(72) Inventors: Cord Haack, Augsburg (DE); Carsten Paul, Augsburg (DE); Bernhard Hörger, Augsburg (DE)

(73) Assignee: Premium Aerotec GmbH

( * ) Notice: Subject to any disclaimer, the term of this patent is extended or adjusted under 35 U.S.C. 154(b) by 0 days.

(21) Appl. No.: 17/319,173

(22) Filed: May 13, 2021

(65) Prior Publication Data
US 2021/0362881 A1 Nov. 25, 2021

(30) Foreign Application Priority Data
May 14, 2020 (DE) ...................... 10 2020 206 076.2

(51) Int. Cl.
*B22F 10/64* (2021.01)
*B33Y 70/00* (2020.01)
*B64F 5/10* (2017.01)
*B33Y 80/00* (2015.01)
*B33Y 10/00* (2015.01)

(52) U.S. Cl.
CPC ............... *B64F 5/10* (2017.01); *B22F 10/64* (2021.01); *B33Y 80/00* (2014.12); *B33Y 10/00* (2014.12); *B33Y 70/00* (2014.12)

(58) Field of Classification Search
CPC ...... B64F 5/10; B22F 10/64; B22F 2005/005; B22F 7/08; B22F 10/28; B33Y 80/00; B33Y 10/00; B33Y 70/00; Y02P 10/25; B64C 2001/0081; B64C 1/061
See application file for complete search history.

(56) References Cited

U.S. PATENT DOCUMENTS

| | | | |
|---|---|---|---|
| 8,398,027 B2 | 3/2013 | Wood | |
| 9,511,446 B2 * | 12/2016 | Kandasamy | ......... B23K 20/127 |
| 9,775,411 B2 | 10/2017 | Dyllong et al. | |

(Continued)

FOREIGN PATENT DOCUMENTS

| | | |
|---|---|---|
| DE | 102013108111 A1 | 2/2014 |
| DE | 102018122813 A1 | 3/2020 |

(Continued)

OTHER PUBLICATIONS

Extended European Search Report including Written Opinion for Application No. 21173542.8 dated Oct. 11, 2021, pp. 1-9 (p. 2 categorizing the cited references).

*Primary Examiner* — Lawrence Averick
(74) *Attorney, Agent, or Firm* — Lerner, David, Littenberg, Krumholz & Mentlik, LLP

(57) ABSTRACT

A method of manufacturing a structural component for a vehicle, in particular an aircraft or spacecraft, includes additively manufacturing a reinforcing plate of a metal material having on a joining surface a plurality of joining arms projecting from the joining surface; and joining the reinforcing plate at the joining surface to a structural element to form the structural component by inserting the joining arms into the structural element such that the joining arms permanently hold the structural element together with the reinforcing plate.

9 Claims, 2 Drawing Sheets

(56) References Cited

U.S. PATENT DOCUMENTS

Figure 1:
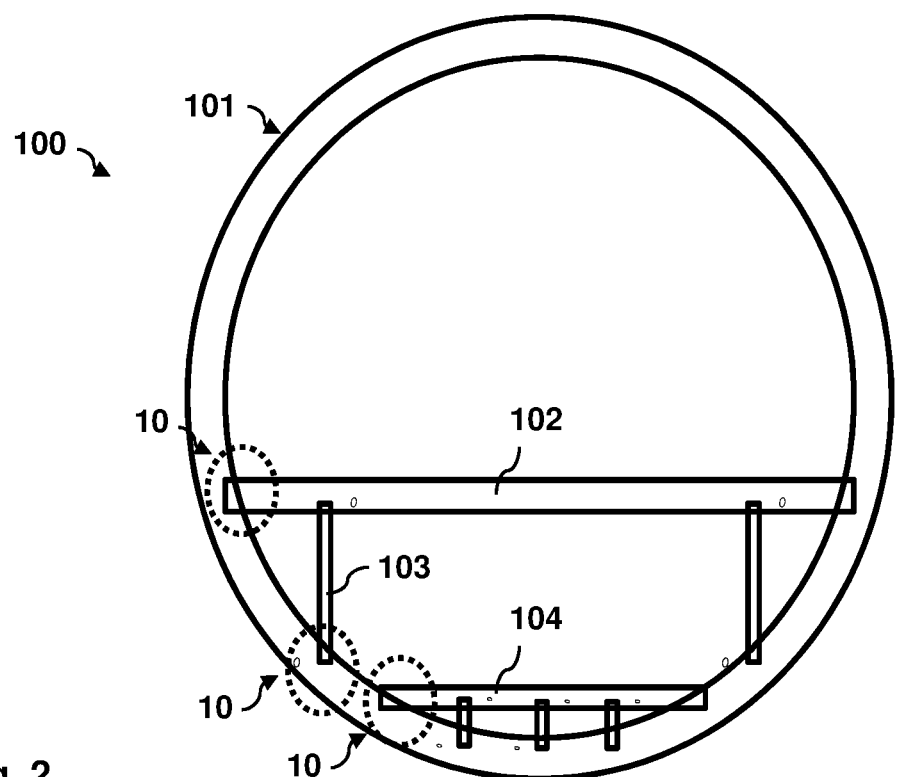

| | | | |
|---|---|---|---|
| 10,583,631 B2* | 3/2020 | Kandasamy | ....... B23K 20/1265 |
| 2014/0034626 A1 | 2/2014 | Illston | |
| 2016/0175982 A1* | 6/2016 | Kandasamy | ....... B23K 20/1245 |
| | | | 228/114.5 |
| 2017/0057204 A1* | 3/2017 | Kandasamy | .......... B23K 20/128 |
| 2019/0055001 A1 | 2/2019 | Kamo et al. | |
| 2019/0084027 A1* | 3/2019 | Werz | .......................... C22F 1/04 |
| 2020/0086967 A1 | 3/2020 | Tiryaki et al. | |
| 2021/0362227 A1* | 11/2021 | Shields | ................... B22F 10/20 |

FOREIGN PATENT DOCUMENTS

| | | |
|---|---|---|
| GB | 719751 A | 12/1954 |
| GB | 2508656 A | 6/2014 |
| JP | 2017145501 A | 8/2017 |
| WO | 2008110835 A1 | 9/2008 |
| WO | 2010112904 A1 | 10/2010 |
| WO | 2010122325 A1 | 10/2010 |

* cited by examiner

METHOD OF MANUFACTURING A STRUCTURAL PART FOR A VEHICLE, IN PARTICULAR AN AIRCRAFT OR SPACECRAFT

The present invention relates to a method for manufacturing a structural part for a vehicle, in particular an aircraft or spacecraft. The invention further relates to a structural part manufactured by such a method, as well as to a fastening arrangement comprising such a structural part.

Although applicable in a wide variety of applications, the present invention and the underlying problem will be explained in more detail with reference to passenger aircraft. However, the methods and devices described can also be used in various vehicles and in all areas of the transport industry, for example for road vehicles, for rail vehicles, for aircraft or for water vehicles.

Many structural aircraft parts, which are classically manufactured from sheet material (e.g. frames, stringers, etc.) or as extruded sections (e.g. cross members, supports, etc.), are subjected to high point loads at certain points during operation. In order to improve the cross-sectional strength of these parts at such points, reinforcements are sometimes added, for example by riveting or by using additional milled parts. In principle, a large number of holes and/or rivets are drilled. Alternatively, starting materials are sometimes brought to the required thickness in complex and thus costly processes. In these cases, excess material is subsequently re-moved in additional working steps around the areas to be reinforced, so that a large amount of material is wasted. There is thus a fundamental need to find sim-pier processes for reinforcing, at least in areas, metal parts in particular with regard to their structural cross-section.

In generative or additive manufacturing processes, also commonly referred to as "3D printing processes", starting from a digitized geometric model of an object, one or more starting materials are sequentially layered and cured. In selective laser melting (SLM), for example, a part is built up layer by layer from a modeling material such as a metal by applying the modeling material in powder form to a base and selectively liquefying it by local laser irradiation, resulting in a solid, cohesive part after cooling. 3D printing offers exceptional design freedom and allows, among other things, objects to be produced at a manageable cost that would be impossible or only possible at considerable expense using conventional methods. For this reason, 3D printing processes are currently widely used in industrial design, in the automotive industry, the aerospace industry or generally in industrial product development, in which a resource-efficient process chain is used for the on-demand small and large-scale production of individualized parts.

Against this background, the present invention is based on the objective of finding simplified solutions for cross-sectional reinforcement of structural vehicle parts.

Accordingly, a method of manufacturing a structural part for a vehicle, in particular an aircraft or spacecraft, is provided. The method comprises additively fabricating a reinforcing plate of a metal material having on a joining surface a plurality of joining arms projecting from the joining surface; and joining the reinforcing plate at the joining surface to a structural component to form the structural part by inserting the joining arms into the structural component such that the joining arms permanently hold the structural component together with the reinforcing plate.

Further, a structural part is provided which is manufactured by a method according to the invention.

Furthermore, a fastening arrangement is provided which comprises a structural part according to the invention and a support structure, the support structure being fastened to the structural part on a fastening surface facing away from the joining surface.

Further, an aircraft or spacecraft with a fastening arrangement according to the invention is provided.

An idea underlying the present invention is to provide a reinforcing plate by means of 3D printing technology with a very large number, e.g. several hundred or thousand, of joining arms which serve as an adhesive for the plate to the structural component. This allows the structural component to be reinforced without the need for drilling and/or riveting processes. The joining arms perform a similar function to the barbed hooks in the case of an ordinary Velcro fastener and are inserted directly into the material of the structural component, thus creating a firm bond with it.

The present approach requires fewer work steps with high efficiency and is easy to implement. For example, the reinforcing plate can be additively manufactured from titanium and directly pressed on during a stamping and/or forming process of a metal blank made of a softer metal for contour production. In this case, the joining arms can penetrate completely into the material of the structural component and produce the fastening with it. This allows considerable savings to be made in costs, production steps, production equipment and time. This applies in particular to sheet materials whose thicknesses should only be higher at force-bearing points and which are traditionally ablated over a large area for this purpose (material waste, expensive starting sheet).

3D printing processes are particularly advantageous because they enable the manufacture of three-dimensional component in primary forming processes without the need for special manufacturing tools tailored to the external shape of the components. This enables highly efficient, material-saving and time-saving manufacturing processes for parts and components. 3D printing makes it possible to manufacture extremely complex geometries at a manageable cost, which would be virtually impossible to produce cost-effectively using conventional methods. Such 3D printing processes are particularly advantageous for structural parts in the aerospace sector, where a large number of different parts are used for specific purposes, which can be produced using such 3D printing processes with low costs, short production lead times and low complexity in the production facilities required for manufacturing.

3D printing processes within the meaning of the present application comprise all generative or additive manufacturing processes in which objects of predefined shape are produced on the basis of geometric models from shapeless materials such as liquids and powders or shape-neutral semi-finished products such as tape or wire-shaped material by means of chemical and/or physical processes in a special generative manufacturing system. 3D printing methods within the meaning of the present application use additive processes in which the starting material is sequentially built up layer by layer in predetermined shapes.

It is understood that the present 3D printing technology used makes it possible to form the reinforcing plate with a variety of other structural functional areas in addition to the joining arms. For example, fixing pins, holes, etc. can be printed in addition to the joining arms for the purpose of manufacturing and/or assembly. Thus, the reinforcing plate can be formed with holes for holders or directly with integrated holders. The reinforcing plate can, for example, include belts as flanges, free areas for connecting components, support belts and/or, for example, punched holes for its own positioning or that of add-on parts.

The fastening arrangement according to the invention can be used, for example, for fastening stiffening structures of an aircraft fuselage. For example, a frame or stringer or other structural part may be fabricated with an integrated reinforcing plate that serves to transversely reinforce the frame or stringer in an attachment region of the structural part for coupling to a support structure. For example, a cross member for a cabin floor, a support bar and/or a cargo floor may be attached to a suitably reinforced region of a frame, e.g. by means of a rivet panel and/or a bolt connection. According to the invention, the reinforcing plate can be pressed into the corresponding mounting area of the structural part already during the fabrication of the corresponding structural part. In this case, it is therefore no longer necessary to subsequently rivet a corresponding reinforcement to the structural part in order to reinforce the mounting area. The corresponding rivet field and the associated structural weakening as well as the additional assembly effort are thus eliminated. In principle, all structural parts of a vehicle, in particular of an aircraft, can be reinforced locally or in certain areas on the basis of the present invention.

Advantageous embodiments and further developments result from the further de-pendent claims as well as from the description with reference to the figures.

According to one further embodiment, the structural component can be pressed together with the reinforcing plate at the joining surface.

For example, the reinforcing plate can be made of or have a high-strength metal material, such as a metal, a metal alloy and/or a metal composite material, in the area of the joining arms. A softer metal material may now be provided for the structural component. Alternatively or additionally, the material thereof can be softened by heating or other suitable process steps. If the reinforcing plate and the structural component are now pressed onto each other, the joining arms can penetrate completely into the material of the structural component and ensure a permanent structural bond between the two components. In principle, this can result in deformation of some or all of the joining arms.

In another example, the structural component may alternatively be made of a plastic composite, such as a fiber-reinforced thermoset or thermoplastic. In this case, too, the reinforcing plate can be formed with sufficiently strong joining arms which can be pressed into the material of the structural component.

According to an alternative embodiment, the structural component can be molded to the reinforcing plate on the joining surface around the joining arms.

For example, a thermoplastic can be injected onto the reinforcing plate and around the joining arms to form the structural component on the reinforcing plate after curing of the thermoplastic. In principle, reinforcing fibers can also be incorporated here and/or fiber composite semi-finished products can be used, e.g. resin-impregnated fiber mats or the like. In this case, the structural component or at least sections of it can be preformed on the reinforcing plate. In this case, the joining surface of the reinforcing plate serves as a forming tool for the structural component, which remains as an integral part of the structural component.

In another example, a fiber composite semi-finished product can be placed on the reinforcing plate already in a deformable state (e.g. a resin-impregnated fiber mesh) and/or subjected there to temperature and/or pressure so that the plastic can enter all the free spaces around the joining arms. In principle, it is even conceivable that a material bond is created between the reinforcing plate and the structural component if the material of the reinforcing plate is also brought into a flowable state at least in the area of the joining surface.

According to a further embodiment, the structural component may comprise a metal material, a thermoset composite material, and/or a thermoplastic composite material.

For example, the structural component can be made of an aluminum or aluminum alloy. Likewise, a metal composite material may be used. In addition, however, the structural component can also be made of fiber-reinforced plastics, e.g. CFRP or GFRP.

According to a further embodiment, the structural component can be pressed as a metal structural blank in a forming process with the reinforcing plate to form the structural component.

For example, the structural component can be produced by stamping, rubber molding (rubber cushion pressing) or superplastic forming by inserting the reinforcing plate into a contour mold and pressing it together with the structural component in the same operation.

Alternatively, however, it is also possible to press the reinforcing plate into the structural component only after the latter has been formed in a second working process.

According to a further embodiment, the structural component can be solution-annealed.

The structural blank can thus first be heated and then pressed together with the reinforcing plate. The material of the structural component is softened in this process and can thus accommodate the joining arms of the reinforcing plate particularly easily. After cooling, the components joined in this way harden to form a component that can no longer be separated, i.e. the reinforcing plate then forms an integral part of the structural part.

According to a further embodiment, the joining arms can be designed to protrude perpendicularly from the joining surface.

For example, a very large number of several hundred or thousand joining arms can be distributed over the entire joining surface at equidistant distances from one another. The joining surface can be flat, for example. However, variants with a curved and/or stepped joining surface are also conceivable. In addition to a vertical alignment, it can also be advantageous in certain applications to design the joining arms at least partially with a more or less pronounced inclination relative to the vertical.

According to a further development, the joining arms can be formed with a hook-shaped tip.

For example, the joining arms can be designed as barbed hooks similar to an ordinary Velcro fastener. In another example, the joining arms can taper conically from a plate base on the joining surface of the reinforcing plate to the tip, e.g. with a circular contour. The tip itself can then be designed similar to an arrowhead or the like, e.g. with a protruding circumferential collar.

According to a further embodiment, the metal material of the reinforcing plate may comprise a high-strength aluminum, iron and/or titanium.

In particular, the reinforcing plate can be made essentially entirely from a corresponding material or a corresponding combination of materials. Modern additive processes allow, among other things, components made of several metals to be built up layer by layer, for example by several print heads depositing different metals simultaneously or one after the other, or by using a corresponding metallic powder mixture.

According to a further embodiment, more than a hundred joining arms can be formed on the joining surface of the reinforcing plate. In particular, more than a thousand joining arms can be formed on the joining surface of the reinforcing plate.

For example, a planar joining surface may be covered with several thousand joining arms forming a two-dimensional dot pattern, wherein the joining arms may be arranged homogeneously with a fixed relative spacing. For example, the reinforcing plate may have a thickness of several millimeters, e.g. 3 mm, and the joining arms may have a length of a predetermined fraction of this thickness, e.g. 1 mm to 1.5 mm.

According to a further embodiment, the reinforcing plate can be formed in a graded manner on an outer surface facing away from the joining surface.

A single or multiple gradation can serve, for example, as a preconnection or for an improved force runout. In a specific example, a gradation can distribute or shift loads and the associated stress peaks along the part by absorbing them from the gradation edge(s).

The above embodiments and further developments can be combined with each other, if useful. Further possible embodiments, further developments and implementations of the invention also comprise combinations of features of the invention described above or below with respect to the embodiments which are not explicitly mentioned. In particular, the skilled person will thereby also add individual aspects as improvements or additions to the respective basic form of the present invention.

Figure 2:
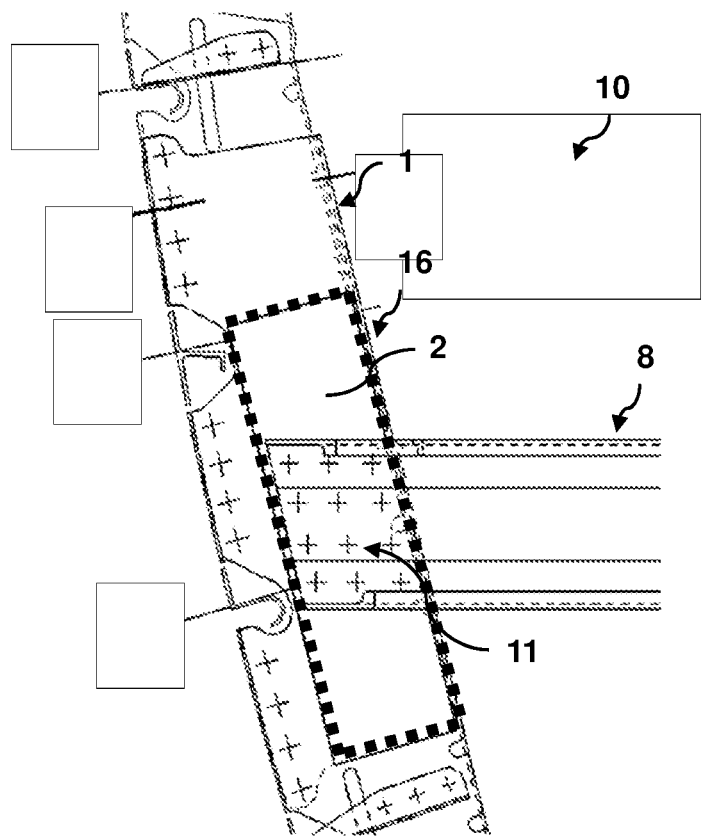
Figure 3:
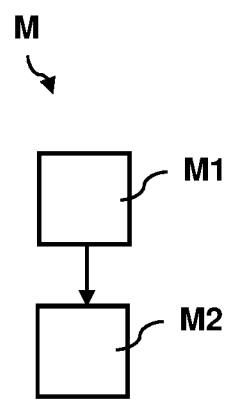
Figure 4:
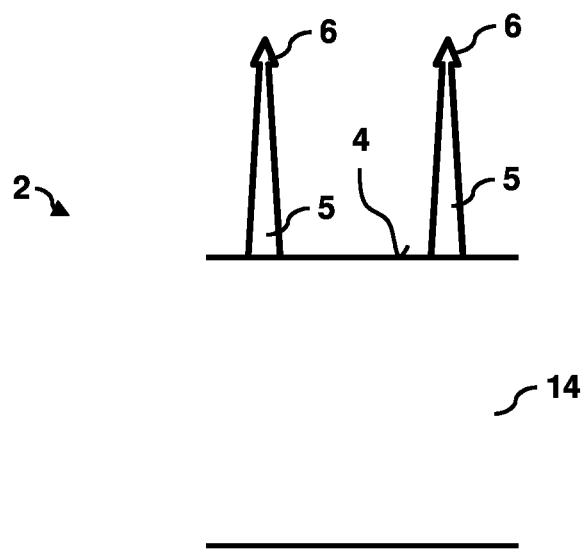
Figure 5:
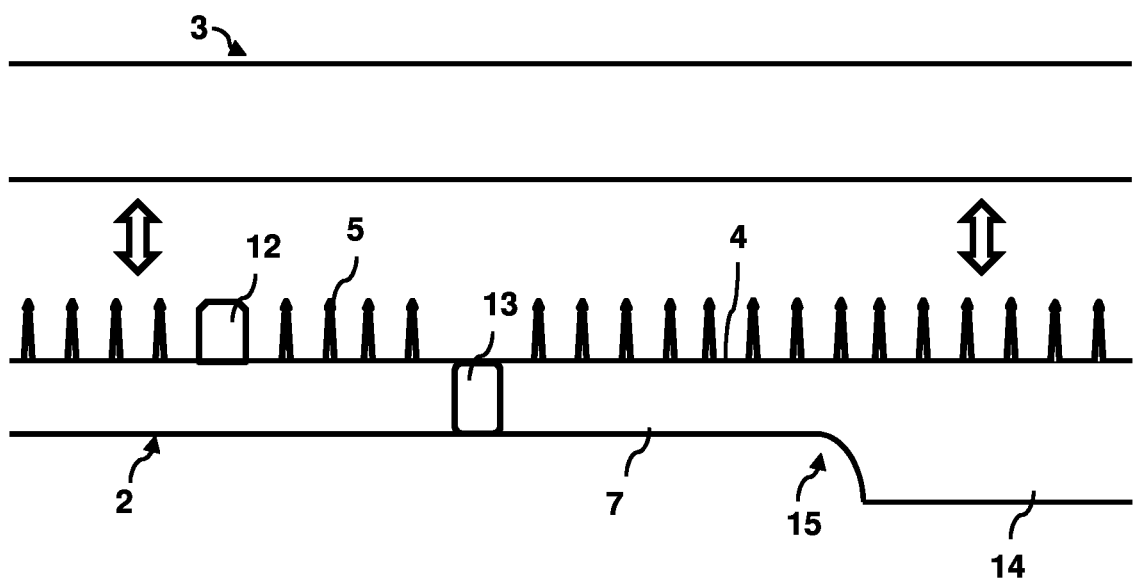
Figure 6:
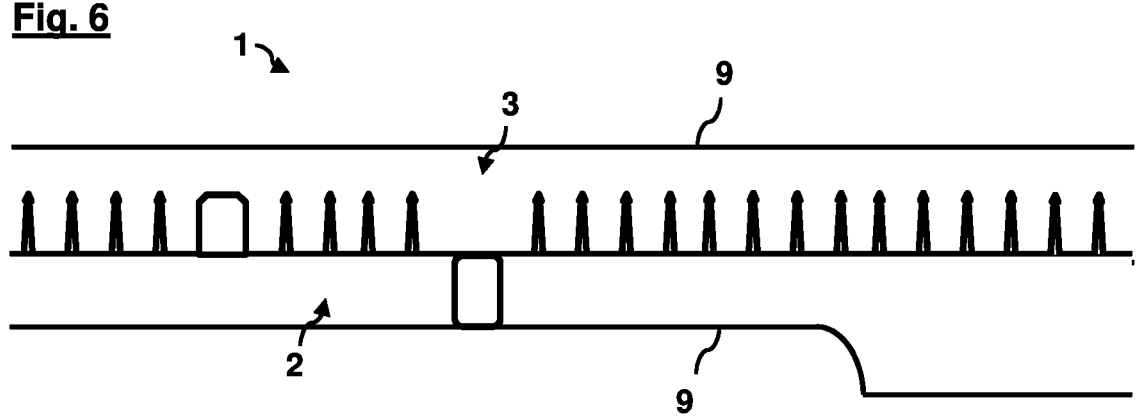

The present invention is explained in more detail below with reference to the examples of embodiments shown in the schematic figures. They show:

FIG. 1 a schematic perspective sectional view of an aircraft with multiple fastening arrangements according to one embodiment of the invention;

FIG. 2 a schematic sectional view of one of the fastening arrangements of FIG. 1 with a structural part according to one embodiment of the invention;

FIG. 3 a schematic flow diagram of a method for manufacturing the structural part of FIG. 2 according to one embodiment of the invention;

FIG. 4 a schematic detailed sectional view of a reinforcing plate for the structural part of FIG. 2;

FIG. 5 a schematic sectional view of the structural part of FIG. 2 during a manufacturing step of the method of FIG. 3; and FIG. 6 a schematic sectional view of the structural part of FIG. 5 after the manufacturing step.

The accompanying figures are intended to provide a further understanding of embodiments of the invention. They illustrate embodiments and, in connection with the description, serve to explain principles and concepts of the invention. Other embodiments and many of the advantages mentioned will result with reference to the drawings. The elements of the drawings are not necessarily shown to scale with respect to each other.

In the figures of the drawings, identical elements, features and components with the same function and the same effect are each given the same reference signs, unless otherwise specified.

FIG. 1 shows a schematic perspective sectional view of an aircraft 100 having a plurality of fastening arrangements 10 in accordance with one embodiment of the invention. One of the fastening arrangements 10 is shown in detail in FIG. 2 with a structural part 1 used therein. A method M for manufacturing the corresponding structural part 1 is shown as a schematic flow diagram in FIG. 3.

The aircraft 100 shown in FIG. 1 may be, for example, a passenger aircraft. The fuselage 101 of a typical passenger aircraft has a rigid framework of stiffening elements which is covered with an outer skin. The framework comprises a series of frames bent in a circumferential direction according to the shape of the fuselage cross-section, and a plurality of longitudinal beams/stringers connected to the frames. Inside the fuselage 101, a plurality of cross beams 102 for supporting a cabin floor are arranged in series in the longitudinal direction of the aircraft 100, each cross beam 102 extending in a transverse direction and being fixed to the frames and/or stringers at both ends. The cross beams 102 are further supported on the fuselage 101 by vertical support struts. In addition, as visible in FIG. 1, a cargo floor 104 is typically provided below the cross beams 102 and is also connected to or supported by the fuselage 102. All of these structural parts are part of what is referred to as the primary structure and contribute to the stiffening of the overall structure of the aircraft 100.

The structural parts of the primary structure are typically attached to each other by rivets or similar means during a major component assembly of the aircraft 100. Many of these parts are classically made in many cases from sheet metal material (e.g., frames) or as extruded sections (e.g., cross beams 102, support struts 103). Especially in the coupling areas of these parts, high point load introductions are to be expected. To ensure that the corresponding loads can be permanently absorbed, the above parts are typically reinforced in their cross-section in the coupling areas by subsequently riveting on flat reinforcing elements.

The process M described below with reference to FIG. 3 provides a simplified solution for cross-section reinforcement of these structural vehicle parts, which makes the above-mentioned subsequent reinforcement superfluous. To this end, the present method takes advantage of additive manufacturing processes, among other things.

Specifically, the method M for manufacturing a structural part 1 comprises, at M1, additive manufacturing of a reinforcing plate 2 made of a metal material, which has, on a joining surface 4, a plurality of joining arms 5 projecting substantially perpendicularly from the joining surface 4. A cross-section of such a reinforcing plate 2 is shown in FIGS. 4 and 5.

The reinforcing plate 2 is made of a high-strength metal or metal alloy, e.g. titanium. In principle, several metals can also be combined in a multi-component process.

Specifically, FIG. 4 shows a plate body 14 of the reinforcing plate 2, which is formed on one side with a joining surface 4 that supports the joining arms 5. The joining arms 5 are designed as hooks, which taper from the joining surface 4 to a tip 6 conically with a circular contour. The tip 6 itself is provided with an arrowhead-like circumferential collar which projects laterally. It is understood that other suitable shapes may be used here, e.g. toothed hooks, etc. The plate body 14 may have a thickness of the order of millimeters, e.g. 3 mm. The joining arms 5 can also have a length in the range of a few millimeters, e.g. 1.5 mm.

As indicated in FIG. 5, the reinforcing plate 2 comprises a very large number of these joining arms 5. For example, several thousand of these joining arms 5 may be distributed at uniform intervals over the entire joining surface. In the example shown, these joining arms 5 are of identical design. However, it is understood that the joining arms 5 can vary in shape and dimension along the joining surface 5. The invention makes use of the fact that even highly complex component geometries can be produced in an integrated process sequence with the aid of additive manufacturing processes without any particular additional effort.

The joining arms 5 now serve, in the manner of a conventional Velcro fastener, to permanently connect the reinforcing plate 2 to a structural component 3 to form a structural part 1. To a certain extent, the reinforcing plate 2 serves as an integrated transverse stiffener, which is already introduced into the structural part 1 as an integral part during its manufacture.

Referring again to FIG. 2, the method M accordingly comprises under M2 as a further step joining the reinforcing plate 2 at the joining surface 4 to a structural component 3 to form the structural part 1, in that the joining arms 5 are introduced into the structural component 3 in such a way that the joining arms 5 permanently hold the structural component 3 together with the reinforcing plate 2.

In the specific example shown, the structural component 3 is a metal structural blank, e.g. made of aluminum, which is pressed with the reinforcing plate 2 in a single operation using a forming technology such as stamping, rubber molding or superplastic forming (cf. arrows in FIG. 5). For this purpose, the reinforcing plate 2 is placed with the structural component 3 in the corresponding contour mold, whereby the structural component 3 is solution annealed for softening. Due to the pressure applied during the subsequent pressing process, the joining arms 5 are impressed into the softened material of the structural component 3 along the joining surface 4.

The arrow-shaped tips 6 of the joining arms 5 serve as barbed hooks which clamp the reinforcing plate 2 in the structural component 3. In principle, the joining arms 5 can also be shaped to a greater or lesser extent. In any case, after demolding and cooling/curing, a one-piece structural part 1 remains whose initial components can no longer be subsequently separated, since the reinforcing plate 2 now forms an integral part of the structural component 1. FIG. 6 shows a schematic cross-section of the part produced in this way.

The design possibilities of typical additive processes also make it possible to mold various auxiliary structures directly into the reinforcing plate 2. Purely by way of example, FIGS. 5 and 6 show a fixing pin 12, which can serve, for example, as a manufacturing and/or assembly aid, and a hole 13, into which, for example, holders, pins or the like can be introduced for positioning this or other parts.

Further, it can be seen in FIGS. 5 and 6 that the reinforcing plate 2 is manufactured with one or more gradations 15 on an outer side 7 facing away from the joining surface 5, i.e. is formed with a variable cross-sectional thickness. Such gradations 15 can serve, for example, to distribute loads or load peaks along the finished structural part 1.

It will be apparent to those skilled in the art that the joining surface 4 by no means has to be designed as a flat surface in all applications (as shown in a simplified form in FIGS. 5 and 6). Rather, the joining surface 4 can also be stepped and/or curved and/or have a more complex course. The joining arms 5 can also be inclined relative to the joining surface 4, e.g. in order to penetrate a correspondingly shaped structural component 3.

A support structure 8 can now be coupled to a structural part 1 produced in this way via the region transversely reinforced with the reinforcing plate 2 to form one of the fastening arrangements 10. In the example of FIG. 2, the structural part 1 is formed as a frame which contains the reinforcing plate 2 in a coupling region 16. The reinforcing plate 2 has been integrated into the frame as a two-dimensional reinforcement along a transverse surface of the frame. A fastening surface (outer surface) 9 of the frame facing away from the joining surface 5 of the reinforcing plate 2 can now serve as a coupling surface for the support structure 8. In the exemplary embodiment in FIG. 2, the support structure 8 is a cross beam 102 of the aircraft fuselage 101, which is riveted to the frame centrally above the reinforcing plate 2 (cf. riveted joints 11 in FIG. 2). With the aid of the invention, a frame blank (i.e. a structural component 3) with a thickness of a few millimeters, e.g. approx. 1.5 mm, can be thickened in certain areas to a multiple or several times its original transverse thickness with the aid of a reinforcing plate 2 of several millimeters.

It is understood that the support structure 8 can also be otherwise coupled to the structural part 1 in the area of the reinforcement plate 2. For example, a connection based on eccentric bolts can be provided alternatively or additionally. Since the reinforcement plate 2 has already been pressed into the frame, i.e. the structural part 1, by means of forming technology during production, the support structure 8 can be attached directly to the structural part 1 without any further measures (e.g. attachment of transverse reinforcements). The classically necessary complex rivet fields in the vicinity of the coupling region 16 are thus avoided. Likewise, frame reinforcements or the like can be omitted if the frame should continue over this region. Corresponding to FIG. 2, further support structures 8 of the aircraft 100 can be attached to correspondingly reinforced structural parts 1, e.g. the support strut 103 and the cargo floor 104.

In the preceding detailed description, various features have been summarized in one or more examples to improve the stringency of the presentation. It should be understood, however, that the above description is illustrative only and in no way limiting. It is intended to cover all alternatives, modifications and equivalents of the various features and embodiments. Many other examples will be immediately and directly obvious to the person skilled in the art based on his technical knowledge in view of the above description.

The examples of embodiments have been selected and described in order to best illustrate the principles underlying the invention and its possible applications in practice. This will enable those skilled in the art to optimally modify and utilize the invention and its various embodiments with respect to the intended application. In the claims as well as the description, the terms "including" and "comprising" are used as neutral language terms for the corresponding terms "containing". Furthermore, the use of the terms "a", "one" and "an" is not intended to exclude a plurality of features and components described in this way.

LIST OF REFERENCE SIGNS 1 structural part
2 reinforcing plate
3 structural component
4 joining surface
5 joining arm
6 tip
7 outer side
8 support structure
9 outer surface
10 fastening arrangement
11 riveted joint
12 fixing pin
13 hole
14 plate body
15 gradation
16 coupling region
100 aircraft 101 fuselage
102 cross beam
103 support strut
104 cargo floor
M method
M1, M2 method steps

The invention claimed is:

1. A method of manufacturing a structural part for a vehicle, comprising:
   additively manufacturing a reinforcing plate from a metal material, which has on a joining surface a plurality of joining arms projecting from the joining surface; and
   joining the reinforcing plate at the joining surface to a structural component to form the structural part by introducing the joining arms into the structural component in such a way that the joining arms permanently hold the structural component together with the reinforcing plate,
   wherein the structural component comprises at least one of a metal material, a thermoset composite material, and a thermoplastic composite material.

2. The method of claim 1, wherein the structural component is pressed with the reinforcing plate at the joining surface or is formed onto the reinforcing plate on the joining surface around the joining arms.

3. The method of claim 1, wherein the structural component is pressed as a metal structural blank in a forming process with the reinforcing plate to form the structural part.

4. The method of claim 3, wherein the structural component is pressed solution-annealed.

5. The method of claim 1, wherein the joining arms are formed so as to project perpendicularly from the joining surface.

6. The method of claim 1, wherein the joining arms are formed with a hook-shaped tip.

7. The method of claim 1, wherein the metal material of the reinforcing plate comprises at least one element selected from the group consisting of high-strength aluminum, iron, and titanium.

8. The method of claim 1, wherein more than one hundred joining arms are formed on the joining surface of the reinforcing plate.

9. A method of manufacturing a structural part for a vehicle, comprising:
   additively manufacturing a reinforcing plate from a metal material, which has on a joining surface a plurality of joining arms projecting from the joining surface; and
   joining the reinforcing plate at the joining surface to a structural component to form the structural part by introducing the joining arms into the structural component in such a way that the joining arms permanently hold the structural component together with the reinforcing plate,
   wherein the reinforcing plate is formed in a graded manner on an outer surface facing away from the joining surface.

* * * * *